US008963363B2

(12) United States Patent
Selker

(10) Patent No.: US 8,963,363 B2
(45) Date of Patent: Feb. 24, 2015

(54) METHOD AND DEVICE FOR PROVIDING AN ELECTRICAL SYSTEM ALTERNATING VOLTAGE IN AN AIRCRAFT

(75) Inventor: Jens Selker, Worms (DE)

(73) Assignee: Airbus Operations GmbH, Hamburg (DE)

( * ) Notice: Subject to any disclaimer, the term of this patent is extended or adjusted under 35 U.S.C. 154(b) by 1063 days.

(21) Appl. No.: 13/015,645

(22) Filed: Jan. 28, 2011

(65) Prior Publication Data

US 2011/0210606 A1    Sep. 1, 2011

Related U.S. Application Data

(60) Provisional application No. 61/298,985, filed on Jan. 28, 2010.

(51) Int. Cl.
| | | |
|---|---|---|
| *B60L 1/00* | (2006.01) | |
| *B60L 3/00* | (2006.01) | |
| *H02G 3/00* | (2006.01) | |
| *H02J 3/40* | (2006.01) | |
| *B60R 25/00* | (2013.01) | |
| *H02J 3/14* | (2006.01) | |

(52) U.S. Cl.
CPC . *H02J 3/40* (2013.01); *B60R 25/00* (2013.01); *H02J 3/14* (2013.01)
USPC .......................................... 307/9.1; 307/10.1

(58) Field of Classification Search
None
See application file for complete search history.

(56) References Cited

U.S. PATENT DOCUMENTS

| | | | | |
|---|---|---|---|---|
| 6,037,752 | A  * | 3/2000 | Glennon | ......................... 322/22 |
| 2006/0157987 | A1* | 7/2006 | Albrecht | ...................... 290/1 A |
| 2011/0041307 | A1* | 2/2011 | Westenberger | ............ 29/402.08 |

FOREIGN PATENT DOCUMENTS

| | | |
|---|---|---|
| DE | 198 21 952 | 11/1999 |
| DE | 1 933 451 | 6/2008 |
| EP | 1 387 460 | 2/2004 |

OTHER PUBLICATIONS

A.C. Hoffmann, I.G. Hansen, R.F. Beach, R.M. Plencner, R.P. Dengler, K.S. Jefferies, R.J. Frye, "Advanced Secondary Power System for Transport Aircraft", *NASA Technical Paper 2463*, May 1, 1985.
"Die Brennstoffzelle geht an Bord—DLR and Airbus Deutschland mit Gemeinschaftsprojekt auf der Hannover Messe", *Stuttgart News Archive*, Apr. 5, 2005.
Office Action of German Priority Application No. 10 2010 001 333. 1-32.

* cited by examiner

*Primary Examiner* — Jared Fureman
*Assistant Examiner* — Aqeel Bukhari
(74) *Attorney, Agent, or Firm* — Greer, Burns & Crain Ltd.

(57) ABSTRACT

The present invention provides a method and a device for providing a three-phase electrical system alternating voltage for an electrical system of an aircraft, a plurality of voltage sources being provided which comprise at least one engine generator and a further voltage source, in particular a fuel cell, comprising one or more frequency converters for converting an alternating voltage of variable frequency provided by the respective engine generator into a first output alternating voltage and comprising at least one cyclo-inverter for cyclo-inverting a voltage provided by the respective further voltage source into a second output alternating voltage which is synchronous with the first output alternating voltage and constitutes the electrical system alternating voltage.

13 Claims, 8 Drawing Sheets

METHOD AND DEVICE FOR PROVIDING AN ELECTRICAL SYSTEM ALTERNATING VOLTAGE IN AN AIRCRAFT

CROSS-REFERENCE TO RELATED APPLICATIONS

This application claims the benefit of U.S. Provisional Application No. 61/298,985, filed Jan. 28, 2010 and German Patent Application No. 10 2010 001 333.1, filed Jan. 28, 2010, the entire disclosures of which are herein incorporated by reference.

FIELD OF THE INVENTION

The invention relates to a device and a method for providing an electrical system alternating voltage for an electrical system of an aircraft.

Aircraft, in particular passenger aircraft, comprise a large number of electric loads which require electrical power for the operation thereof. For example, a passenger aircraft can contain a plurality of galleys which have a high electricity consumption for the operation thereof. These electric loads are supplied with a supply voltage via an electrical system of the aircraft. In conventional aircraft, an alternating voltage of variable frequency is supplied by engine generators which in turn are driven by engines of the aircraft. The engine generators generate an alternating voltage of variable frequency as a function of the rotational speed of the engine. The frequency of the alternating voltage provided can vary in a relatively wide frequency range as a function of the rotational speed of the engine. The frequency of the alternating voltage within the electrical system is not a measure for the loading of the electrical system by electric loads, but rather depends on the rotational speed of the engine. The engine generators must ensure that the various electric loads of the aircraft, for example the galleys, are supplied with sufficient electrical power at all times. EP 1 387 460 B1 describes a method for supplying a galley of a commercial aircraft with power. During a flight, the power required by the electric loads can vary greatly. For example, little or no power is consumed by the galleys during take-off and landing phases of the aircraft. Typically, a plurality of galleys operate simultaneously within the aircraft to cater for passengers. For this reason, considerable and sudden changes in power and load can occur in the electrical system of a conventional aircraft of this type if one or more galleys are activated at the same time. Since the electrical system must also reliably supply other electric loads with alternating voltage, the engine generators are designed for a rated maximum capacity, in order also to offer reserve capacity.

SUMMARY OF THE INVENTION

An object of the present invention is to provide a device and a method for providing an electrical system alternating voltage for an electrical system of an aircraft, which improves a conventional electrical system in terms of efficiency and stability.

This object is achieved according to the invention by a device having the features given in claim 1.

The invention provides a device for providing an electrical system alternating voltage, in particular a three-phase electrical system alternating voltage, for an electrical system of an aircraft, a plurality of voltage sources being provided which comprise at least one engine generator and further voltage sources, the device comprising:

a frequency converter for converting an alternating voltage of variable frequency provided by the respective engine generator into an output alternating voltage and comprising a cyclo-inverter for cyclo-inverting a voltage provided by the respective further voltage source into a second output alternating voltage which is synchronous with the first output alternating voltage and constitutes the electrical system alternating voltage.

The device according to the invention provides an electrical system alternating voltage with an approximately constant controlled frequency f. This supply frequency f of the electrical system constitutes a measure for the loading of the electrical system by the active electric loads of the aircraft.

Compared to a conventional electrical system for an aircraft, the device according to the invention for an electrical system has the advantage that the engine generators for generating the necessary alternating voltage for the electrical system no longer need to be designed for the maximum load and for this reason also consume relatively little fuel, for example kerosene.

A further advantage compared to conventional electrical systems of aircraft is that the frequency of the available alternating voltage is now a measure for the loading of the electrical system by various electric loads and frequency-dependent load shedding is thus possible, for example in order to deactivate load units in a targeted manner when the frequency drops and thus to stabilise the network.

The device according to the invention provides an electrical system alternating voltage with an approximately constant controlled voltage U. This supply voltage U of the electrical system constitutes a measure for the loading of the electrical system by the reactive electric loads of the aircraft.

In addition to one or more engine generators, the device according to the invention comprises at least one further voltage source which can supply additional power via the electrical system via an associated cyclo-inverter. For this reason, the device according to the invention has the advantage that the engine generators do not need to be designed for the rated maximum capacity, since the additional voltage sources provide reserve capacity. Since the engine generators consequently do not need to provide the rated maximum capacity on their own, they can be dimensioned to be smaller, in such a way that fuel, for example kerosene, can also be saved as an end result.

Since the supply frequency of the electrical system in the device according to the invention depends on the loading of the electrical system, the device according to the invention makes frequency-dependent load shedding possible, for example in order to deactivate less critical electric loads in a targeted manner if the frequency of the electrical system drops.

In a possible embodiment of the device according to the invention, the further voltage source comprises a fuel cell which provides a direct voltage which is converted into the second output alternating voltage by an associated cyclo-inverter.

One advantage of providing a fuel cell is that said fuel cell can supply a relatively high power at a relatively low dead weight. A further advantage of a fuel cell is that it burns hydrogen and produces water. This water produced during the operation of the fuel cell can be provided to the passengers of the aircraft as useful water, for example for washing hands. As a result of this, an aircraft needs to carry less water at take-off and fuel can thus be saved during take-off of the aircraft.

In a further embodiment of the device according to the invention, the cyclo-inverter contains a control circuit for controlling the output alternating voltage, the control circuit comprising a primary control for synchronising the output alternating voltages and secondary controls for controlling the supply frequency and the effective value of the electrical system voltage.

The supply frequency f of the electrical system alternating voltage depends on the loading of the electrical system by an active power P and the effective value of the electrical system alternating voltage is dependent on the loading of the electrical system by a reactive power Q. This means that the frequency and the voltage of the electrical system can constitute controlled variables.

In an embodiment of the device according to the invention, the secondary control controls the supply frequency as a function of an active power default $P_{setpoint}$. This load default or power setpoint can be calculated and adjusted to optimise operation.

In an embodiment of the device according to the invention, the active power default $P_{setpoint}$ is provided for the secondary control for controlling the supply frequency f of the electrical system.

The active power default $P_{setpoint}$ is preferably adjusted and calculated as a function of parameters which include power requirements of electric loads, a power capacity of the respective voltage source and a production cost for the provision of the power by the respective voltage source.

In a possible embodiment of the device according to the invention, the control circuit further comprises a detection unit which detects a sudden change in load on the basis of the supply voltage and the supply frequency f of the electrical system.

In a possible embodiment of the device according to the invention, the control circuit further comprises a calculation unit which calculates, on the basis of the detected supply voltage and the detected supply frequency f of the electrical system, an active power P and a reactive power Q as reference variables for the primary control and the secondary control of the control unit.

In an embodiment of the device according to the invention, electric loads which are connected to the electrical system are deactivated if the supply frequency of the electrical system falls below a lower threshold frequency.

In a further embodiment of the device according to the invention, electric loads are connected to the electrical system if the supply frequency of the electrical system exceeds an upper supply frequency.

In a possible embodiment of the device according to the invention, the secondary control controls the effective value of the supply voltage as a function of a reactive power default $Q_{setpoint}$.

In a possible embodiment of the device according to the invention, the frequency converters and the cyclo-inverters are each connected to a bus bar of the electrical system, and these bus bars can be interconnected via a transfer line or via a further bus bar of the electrical system.

In a possible embodiment of the device according to the invention, various electric loads which are supplied with the electrical system alternating voltage are connected to the bus bars via power switches or load switches.

In a possible embodiment of the device according to the invention, an interface for supplying a connectable external electric load is provided on one of the bus bars and is supplied with the electrical system alternating voltage of the aircraft while the aircraft is on the ground.

In a further possible embodiment of the device according to the invention, the additionally provided voltage source is a fuel cell which during the operation thereof produces water which is provided to the passengers of the aircraft as useful water.

The invention further provides a method for providing an electrical system alternating voltage for an electrical system of an aircraft, the method having the features given in claim 13.

The invention provides a method for providing an electrical system alternating voltage for an electrical system of an aircraft, the method comprising the steps of:

detecting a sudden change in load in the electrical system of the aircraft on the basis of a drop in the supply frequency of the electrical system alternating voltage in the electrical system; and carrying out a frequency compensation adjustment by feeding into the electrical system power provided by at least one frequency converter, which converts an alternating voltage provided by an engine generator of the aircraft into a first output alternating voltage, and by feeding into the electrical system power provided by a cyclo-inverter, which converts a voltage provided by a further voltage source into a second output alternating voltage which is synchronous with the first output voltage source and, together with the first output alternating voltage, constitutes the electrical system alternating voltage.

In a possible embodiment of the method according to the invention, a load compensation adjustment is additionally carried out after completion of the frequency compensation adjustment, a power provided by the frequency converter being reduced, at least in part, and the power provided by the cyclo-inverter being increased by the same amount.

The invention provides a passenger aircraft comprising a device for providing an electrical system alternating voltage for an electrical system of the passenger aircraft, a plurality of voltage sources being provided which comprise at least one engine generator and further voltage sources, the device comprising a frequency converter for converting an alternating voltage of variable frequency provided by the respective engine generator into a first output alternating voltage and comprising a cyclo-inverter for cyclo-inverting a voltage provided by the respective further voltage source into a second output alternating voltage which is synchronous with the first output alternating voltage and, together with the first output alternating voltage, constitutes the electrical system alternating voltage of the electrical system.

In the following, embodiments of the device according to the invention and the method according to the invention for providing an electrical system alternating voltage for an electrical system of an aircraft will be described in further detail with reference to the accompanying figures, in which:

DESCRIPTION OF EXEMPLARY EMBODIMENTS

Figure 1:
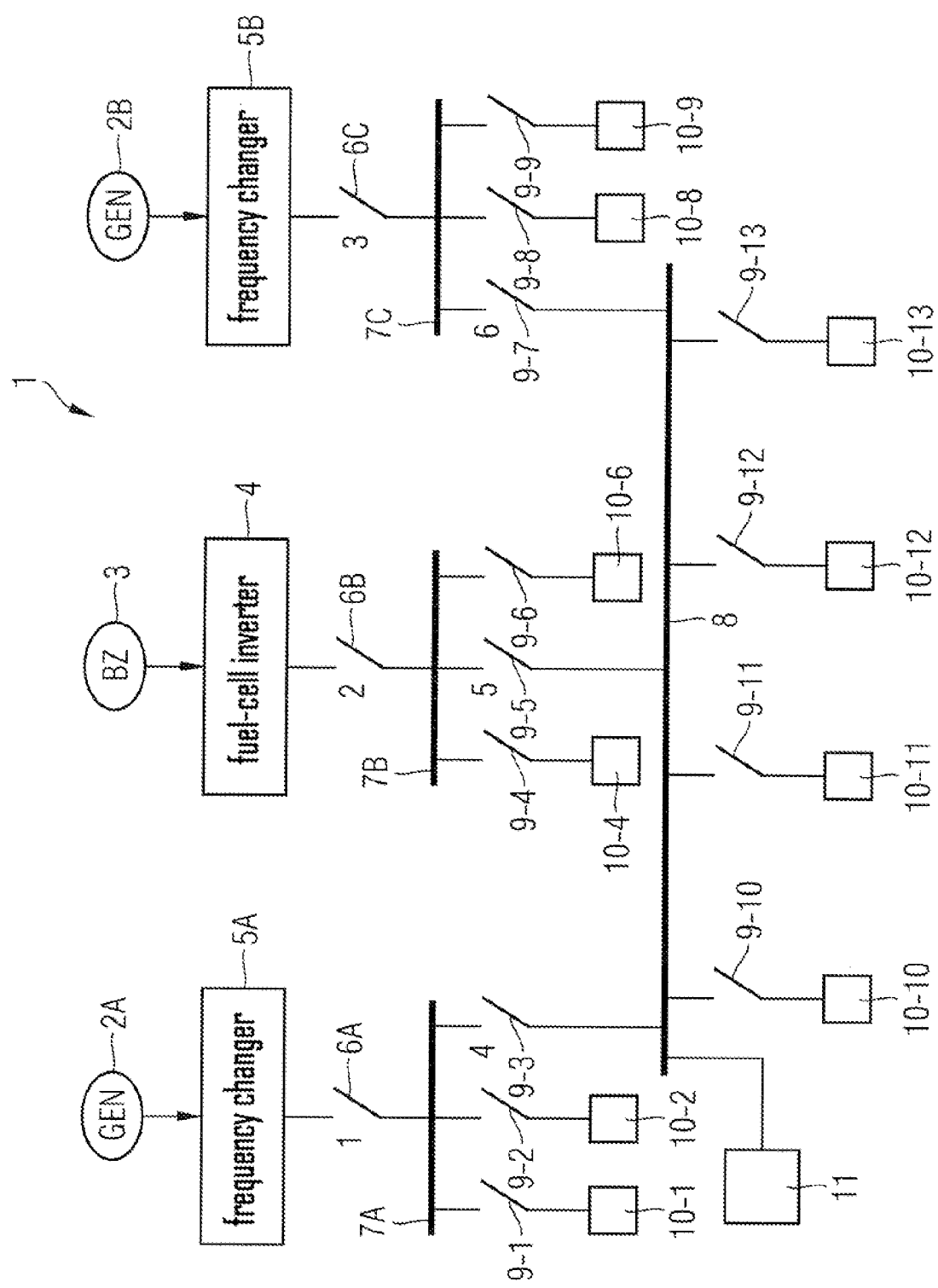
FIG. 1 is a circuit diagram showing a possible embodiment of the device according to the invention for providing an electrical system alternating voltage for an electrical system of an aircraft.

Referring to FIG. 1, the device 1 according to the invention for providing an electrical system alternating voltage for an electrical system of an aircraft comprises a plurality of voltage sources. In the example shown in FIG. 1, the aircraft has two engine generators 2A, 2B which are driven by two engines of the aircraft. In the embodiment shown in FIG. 1, a further voltage source 3 is provided. The number of additional voltage sources 3 can vary and can comprise for example two, three or more voltage sources. In the example shown in FIG. 1, the additional voltage source is a fuel cell BZ which provides a direct voltage. Alternatively, the additional voltage source 3 can also be formed by a different direct voltage source, for example a battery. In a further alternative embodiment, the additional voltage source 3 is not formed by a direct voltage source but by an alternating voltage source. In this case, a further frequency converter is used instead of the inverter.

During the operation thereof, the fuel cell BZ shown in FIG. 1 burns hydrogen ($H_2$) to form water ($H_2O$) and produces a direct voltage. This direct voltage is converted into an output alternating voltage by an associated cyclo-inverter 4. A frequency converter 5A, 5B is connected to each of the two engine generators of the aircraft. The frequency converters 5A, 5B are each provided for converting the alternating voltage AC of variable frequency provided by the respective engine generator 2A, 2B into a first output alternating voltage. The frequency changer 5A, 5B can consist of an AC/DC converter having a DC/AC converter connected in series. This DC/AC converter constitutes an inverter. The output alternating voltage provided by the frequency changers 5A, 5B has an approximately constant controllable supply frequency f. From the direct voltage supplied thereto, the cyclo-inverter 4, which is connected to the fuel cell 3, produces a second output alternating voltage which, owing to the control circuit provided in the cyclo-inverter 4, is synchronous with the output alternating voltage provided by one of the frequency converters 5A, 5B in each case. The first output alternating voltage and the second output alternating voltage, provided by the cyclo-inverter 4, are thus mutually synchronous and constitute the electrical system alternating voltage of the electrical system. The first and second output alternating voltages are of the same frequency f and the same phase. The various power converters, i.e. the two frequency converters 5A, 5B and the cyclo-inverter 4 of the fuel cell, are each connected to an associated bus bar 7A, 7B, 7C via power switches 6A, 6B, 6C. In the embodiment shown in FIG. 1, each power converter thus comprises an associated bus bar 7A, 7B, 7C, and these bus bars can be interconnected via a further bus bar 8 in the embodiment shown. As shown in FIG. 1, electric loads 10-1, 10-2 are connected to the first bus bar 7A of the frequency changer 5A via power switches 9-1, 9-2. This first bus bar 7A is connected to the common bus bar 8 via a further power switch 9-3. The second bus bar 7B in turn comprises power switches 9-4, 9-5, 9-6 for connecting further electric loads 10-4, 10-6 and for connecting to the common bus bar 8. The third bus bar 7C of the second frequency changer 5B can also be connected to the common bus bar 8 and to electric end loads 10-8, 10-9 via power switches 9-7, 9-8, 9-9. Further electric end loads 10-10, 10-11, 10-12, 10-13 can also be connected to the common bus bar 8 via power switches 9-10, 9-11, 9-12, 9-13.

The embodiment shown in FIG. 1 shows a balanced electrical system topology comprising two independent engine generators 2A, 2B and their associated frequency changers or frequency converters 5A, 5B as well as a fuel cell 3 having an associated cyclo-inverter 4.

The balanced network topology shown in FIG. 1 has the advantage that the two engines which drive the engine generators 2A, 2B, of the aircraft are usually subject to balanced loading. The electric loads 10-i shown in FIG. 1 can be any desired electric loads of an aircraft, for example galleys.

In a possible embodiment of the device 1 according to the invention, an interface for supplying a connectable external electric load is provided on a bus bar. For example, FIG. 1 shows an interface 11 of this type for connecting an external electric load. This external load can, for example, also be an electric load of a different aircraft. When the aircraft containing the device 1 shown in FIG. 1 is on the ground, it is possible for the interface 11 to connect an external electric load to the electrical system of the aircraft. For example, an aircraft which requires power or energy can obtain this from an aircraft located adjacent thereto on an airfield. For example, a large aircraft which has a plurality of fuel cells 3 can supply an adjacent aircraft of which the energy reserves are running low with electricity via the interface 11. This lends itself in particular to situations when the two aircraft are located on an airfield which does not have the necessary means for providing an electrical system alternating voltage.

In a possible embodiment, the aircraft which comprises the electrical system shown in FIG. 1 is used exclusively for making an electrical system voltage available to aircraft or other units parked adjacent to it. In this case, the aircraft comprises for example a large number of fuel cells 3 and for example does not carry any passengers. In a possible embodiment, this aircraft comprises in the fuselage thereof a plurality of interfaces 11 for connecting further external electric loads. In a possible embodiment, the supply frequency f of the electrical system can be switched between different frequencies or setpoint frequencies, for example between f=400 Hz and f=50 Hz.

Figure 2:
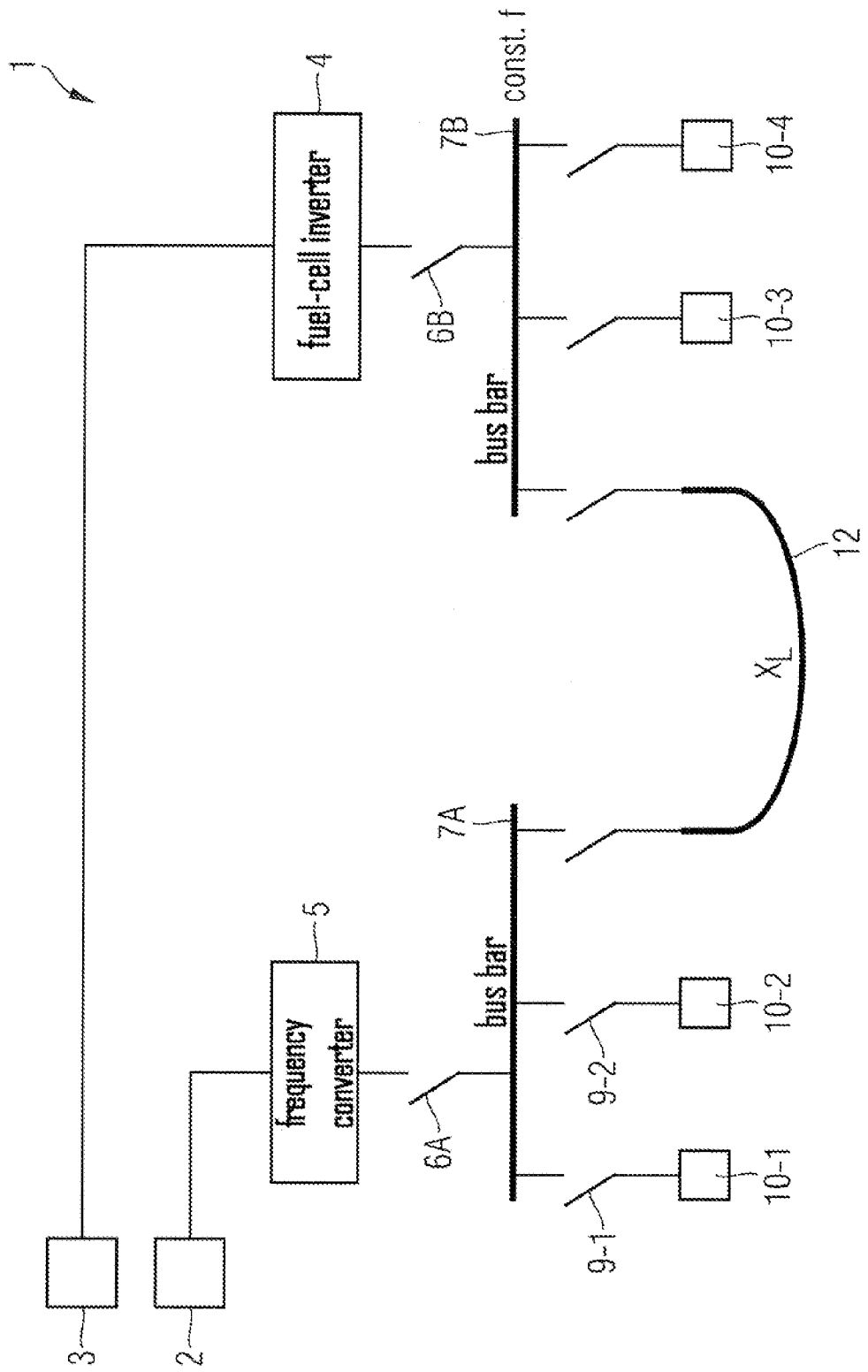
FIG. 2 is a further circuit diagram showing a further embodiment of the device according to the invention for providing an electrical system alternating voltage for an electrical system of an aircraft.

FIG. 2 shows a further embodiment of a device for providing an electrical system alternating voltage for an electrical system of an aircraft. In this embodiment, the aircraft has an engine generator 2 which is connected to an associated bus bar 7A via an associated frequency converter 5. In the example shown in FIG. 2, the fuel cell 3 is connected to a further bus bar 7B via an associated fuel-cell inverter 4. In the embodiment shown in FIG. 2, the two bus bars 7A, 7B are electrically interconnected via a transfer line 12. More transfer lines 12-i can also be provided.

Figure 3:
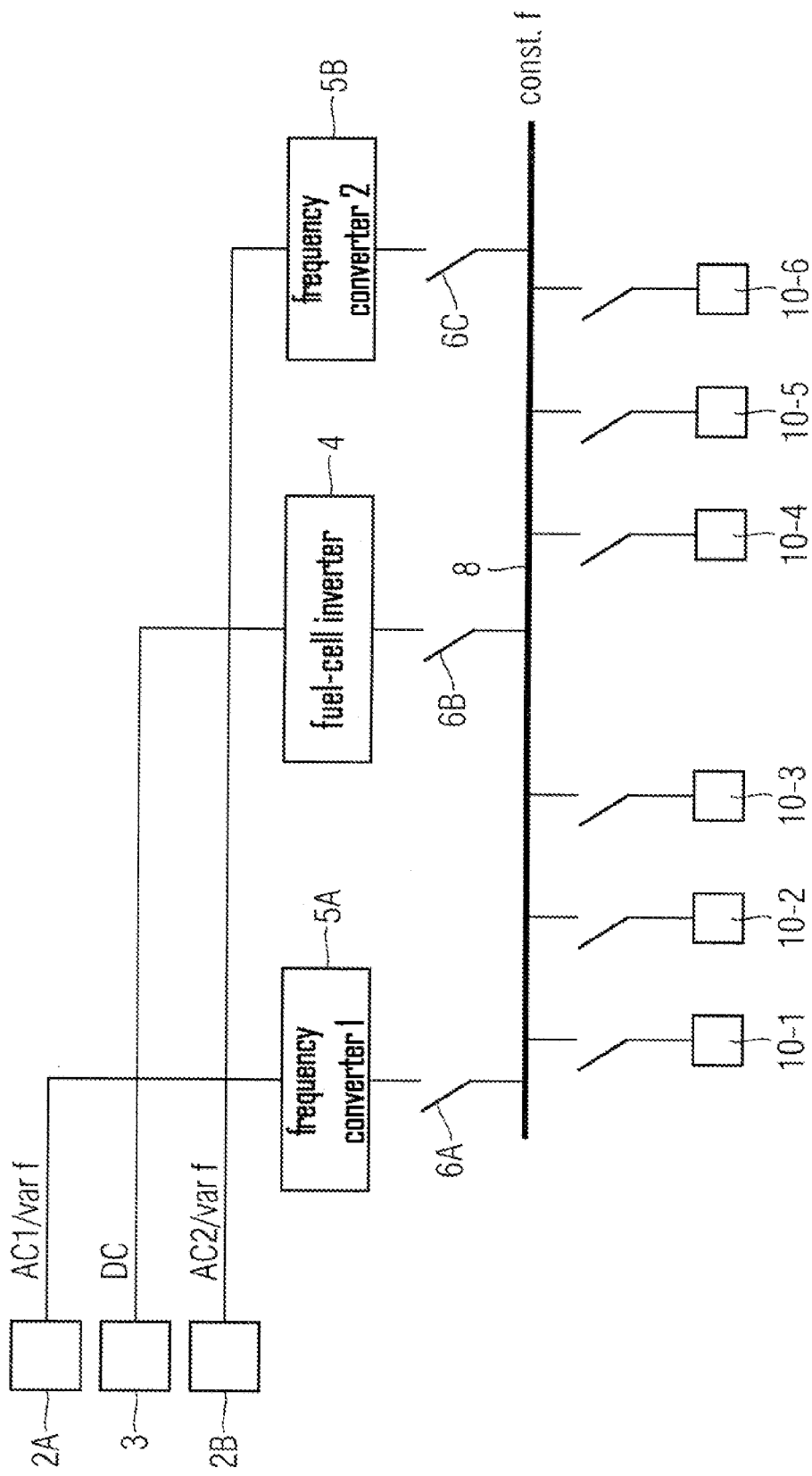
FIG. 3 is a circuit diagram showing a further embodiment of the device according to the invention for providing an electrical system alternating voltage for an electrical system of an aircraft.

FIG. 3 shows a further embodiment of the device according to the invention for providing an electrical system alternating voltage for an electrical system of an aircraft. In the embodiment shown in FIG. 3, the electrical system comprises only one bus bar 8, which is directly connected to the power converter, i.e. the frequency converters 5A, 5B and the fuel-cell inverter 4, via load switches 6A, 6B, 6C. The electrical system shown comprises one frequency converter 5A, 5B per side of the aircraft or per engine, as well as a fuel-cell inverter 4.

Figure 4:
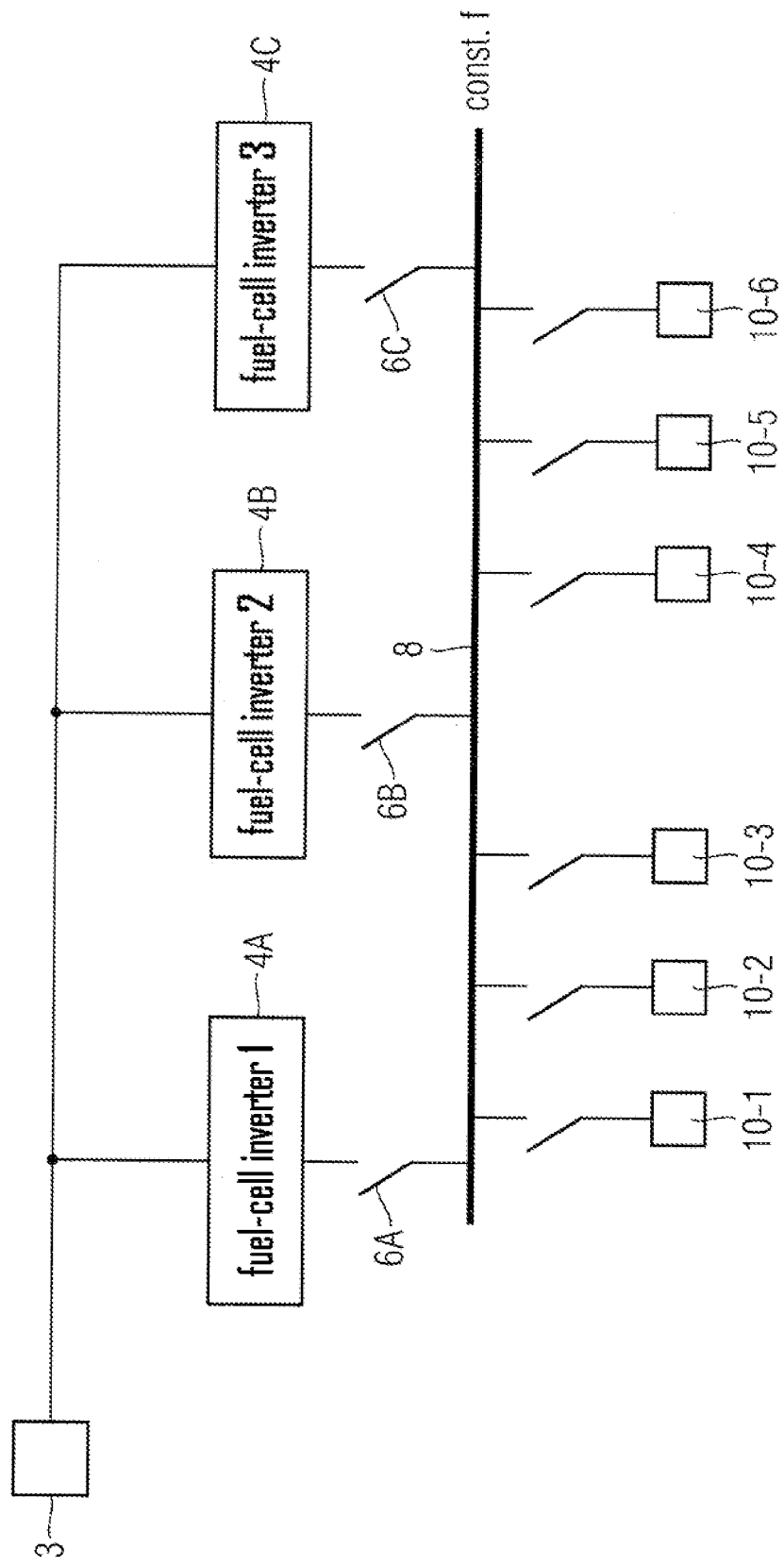
FIG. 4 is a circuit diagram showing a further embodiment of the device according to the invention for providing an electrical system alternating voltage for an electrical system of an aircraft.

FIG. 4 shows a further embodiment of the device 1 according to the invention for providing an electrical system alternating voltage for an electrical system of an aircraft. In the embodiment shown, 3 fuel cells are connected to the common bus bar 8 of the electrical system via respective fuel-cell inverters 4A, 4B, 4C. The electrical system shown in FIG. 4 corresponds to a network which is formed for example by the deactivation or failure of the engine generators 2A, 2B. The engine generators 2A, 2B are deactivated for example after the engines of the aircraft have been shut down on the ground.

In the embodiments shown in FIG. 1-4, the device 1 according to the invention uses one or more fuel cells 3 as power generators or for providing a direct voltage. Alternative means, for example batteries, can also be implemented as direct voltage generators. Using a fuel cell 3 as a direct voltage supplier has the advantage that the fuel cells supply further by-products, namely thermal energy, water and low-oxygen exhaust air, making it possible to increase the efficiency of the flight operation. By providing the additional fuel cells, the power taken up from the engine generators 2A, 2B can be reduced. This leads to fuel consumption being reduced. Providing the fuel cells and the associated inverter 4 also makes it possible to buffer peak loads in the electrical system which are caused by the intermittent operation of electric loads. By operating the additional voltage source 3, the level of reliability of the voltage supply in the electrical system can also be increased. The power converters, i.e. the frequency converter 5 and the inverter 4, feed the power to at least one bus bar, and these bus bars are interconnected via a transfer line 12 or further bus bars.

In the case of parallel operation of all the voltage or power sources 2, 3, the supply voltage provided is synchronised on the output side by the power converters. For this purpose, the inverter 4, which converts the direct voltage provided by the fuel cell 3 into an output alternating voltage, comprises a control circuit. In a possible embodiment, the frequency converters 5A, 5B also comprise a corresponding control circuit for converting the alternating voltage of variable frequency provided by the engine generators 2A, 2B. The various feed power converters, i.e. the inverter 4 and the frequency converter 5, are each preferably equipped with an independent control circuit which detects effective electrical parameters of the electrical system and provides the respective output alternating voltage as a function thereof. This control circuit adapts the generator power and load power to a setpoint frequency $f_{setpoint}$ and additionally ensures a particular distribution of the standard power to the various voltage sources 2, 3.

In the case of simultaneous operation of two power converters, i.e. an inverter 4 and/or at least one frequency converter 5, the output alternating voltages produced in each case are synchronised in the device 1 according to the invention. In a preferred embodiment of the device according to the invention, a control circuit is implemented which operates without direct communication between the power converters or via a superordinate central control. In a preferred embodiment of the device according to the invention, an independent control circuit, which ensures that the associated power converter is synchronised with the electrical system, is provided in each power converter 4, 5. This control circuit provided in the power converter is preferably formed in such a way that it can detect effective electrical parameters in the bus bars connected thereto and then adjusts the output voltage and frequency of the associated power converter 4, 5 on the basis of said parameters, in such a way that the power converter can be operated synchronously with further power converters in the same network. In this preferred embodiment, each power converter 4, 5 automatically adapts the output voltage and frequency thereof, owing to its independent control circuit. This has the advantage that the individual power converters 4, 5 can simultaneously feed a common power network and are independent of one another. In this configuration, the electrical system is therefore resistant to failures of individual power converters and therefore operates in a particularly reliable manner. In this embodiment, if a power converter, for example a frequency converter 5 or a fuel-cell inverter 4 fails, it is possible to continue to operate the remaining power converters. In this embodiment, an external and superordinate control means is not required or provided. As a result, a high level of reliability of the electrical system is achieved overall. In the case of parallel operation of the power converters, all the output alternating voltages are always synchronised with one another and the power converters have a fixed load distribution without having to communicate with one another. By means of a phase-independent capacitor voltage control, it is possible, for example, to supply unbalanced phase loads via the electrical system. A "primary control" which consists of an active and a reactive power controller can be superimposed on this capacitor voltage control. The active power controller adjusts a phase angle between the capacitor voltage and the supply voltage, in order to modify the active power output into the electrical system.

In contrast, the reactive power controller adjusts the effective value of the capacitor voltage, in order to control or regulate the reactive power. The setpoints for the two power controllers can be derived as functions $P(f)$ and $Q(U)$. These functions can, for example, be stored as "statics" in memories as operation characteristics. The primary control of the control circuit ensures that the voltage sources remain synchronous and a particular load distribution among the voltage sources is fixed or set by the statics or stored characteristics. The supply frequency f of the electrical system and the effective value of the supply voltage can vary within certain narrow limits. A secondary control provided in the control circuit can shift the characteristics or statics and in this way modify the frequency f and the effective value of the supply voltage. As a result, the load distribution of the voltage sources changes. The original load distribution can be reset by a further controller component of the control circuit. In this embodiment, no communication between the power converters, i.e. the inverters 4 and the frequency converters 5, is required for the overall control.

Figure 5:
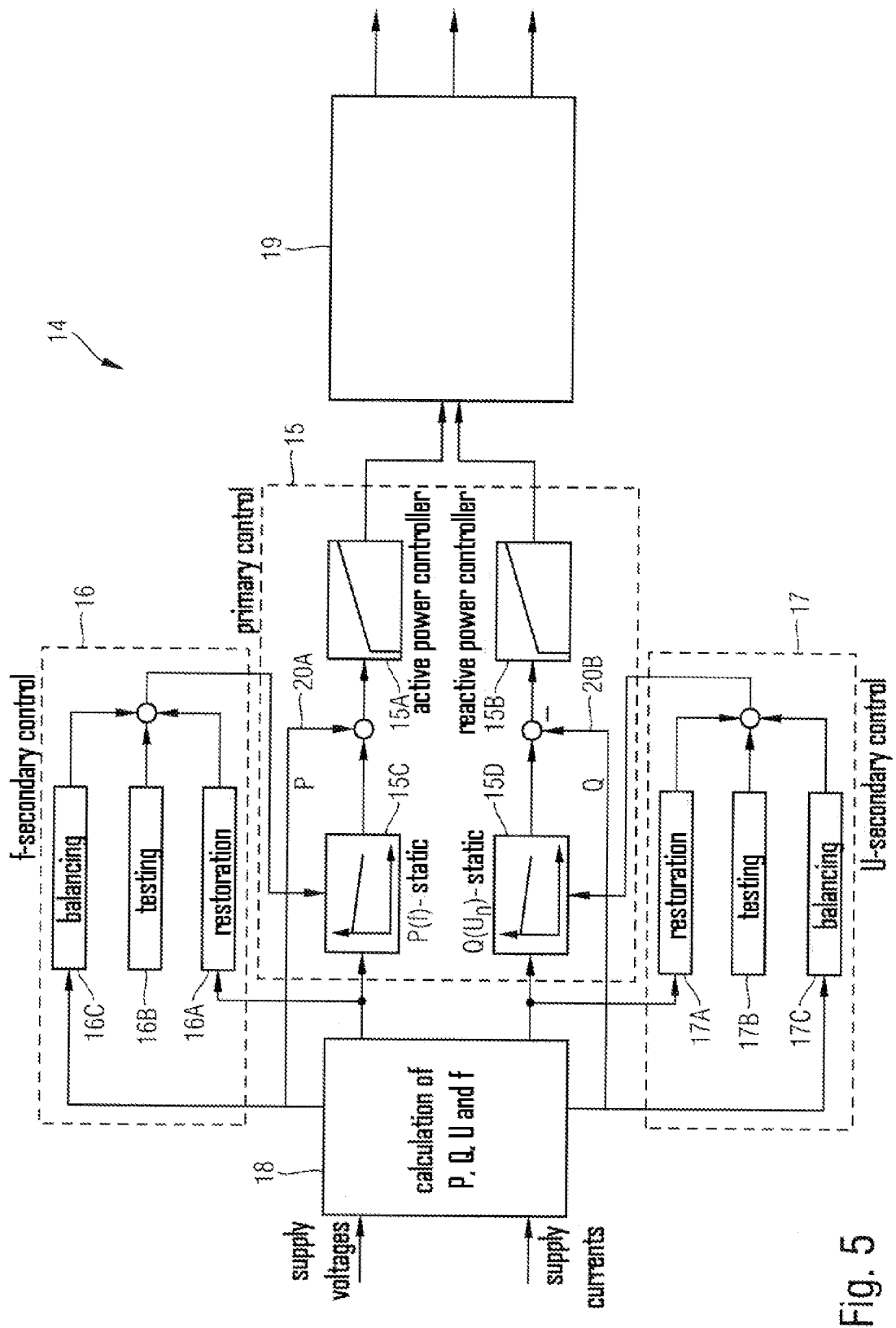
FIG. 5 is a block diagram of an embodiment of a control circuit which can be used within the device according to the invention for providing an electrical system alternating voltage for an electrical system of an aircraft.

FIG. 5 shows a specific embodiment of a control circuit of this type which carries out a reliable control without communication or data exchange with other control circuits. A control circuit of this type is described in part in EP 1 933 451 A2.

The control circuit 14 shown in FIG. 5 is preferably integrated into all power converters, i.e. fuel-cell inverters 4 and frequency converters 5. The control circuit 14 controls the respective output alternating voltages produced by the power converters. The control circuit 14 basically comprises a primary control 15 for synchronising the output alternating voltage provided and one or more secondary controls. In the embodiment shown in FIG. 5, the control circuit 14 contains a secondary control 16 for controlling the supply frequency and a further secondary control 17 for controlling an effective value of the electrical system voltage to be provided. The supply frequency f of the electrical system alternating voltage depends on the loading of the electrical system by active power P. The effective value of the electrical system alternating voltage further depends on the loading of the electrical system by reactive power Q. The control circuit 14 further contains a detection unit 18 which detects a sudden change in load ΔP on the basis of the supply voltage and the supply frequency f of the electrical system. This detection unit 18 can contain a calculation unit which, on the basis of the detected supply voltage and the detected supply frequency f of the electrical system, calculates an active power P and a reactive power Q which are used as reference variables for the primary control 15 and the secondary controls 16, 17 of the control circuit 14. In the embodiment shown in FIG. 5, the primary control 15 is connected on the output side to a power converter output voltage controller 19.

With reference to FIG. 5, the primary control 15 contains an active power controller 15A and a reactive power controller 15B. The frequency f calculated by the unit 18 is used for controlling the supply frequency via the active power controller 15A. The voltage U determined by the detection unit 18 is used for controlling the supply voltage via the reactive power controller 15B. In the embodiment shown in FIG. 5, the primary control 15 takes into account static characteristics which, for example, are stored in memories 15C, 15D. For example, a frequency/active power characteristic P(f), which is used for frequency control, is stored in the memory 15C. A voltage reactive power characteristic Q(n) for voltage control is stored in the memory 15D. The unit 18 calculates from the detected supply voltage and the detected supply frequency f of the electrical system an effective active power P which is applied to a differential member of the primary control 15 via a line 20A. The unit 18 further calculates from the detected supply voltage and the detected supply frequency f of the electrical system a reactive power Q which is applied to a further differential member of the primary control via a line 20B as a reference variable for the primary control 15.

As shown in FIG. 5, two secondary controls 16, 17 are provided, namely a secondary control 16 for secondary frequency control and a control 17 for secondary voltage control. The two secondary controls 16, 17 cause the characteristics stored in the primary control 15 in the memory units 15C, 15D to be shifted. Shifting the characteristics can have the effect that the characteristics are shifted back to setpoint values, in such a way that the predetermined frequency f and the predetermined voltage can be maintained in the case of a given load in the network. The controlled values are restored in the secondary controllers 16, 17 in this way by restoration modules 16A, 17A. Each of the secondary controls additionally comprises a test module 16B, 17B in order to be able to carry out balancing even in the time slots during which no change in load occurs in the electrical system. Each of the secondary controls additionally comprises a balancing module 16C, 17C in which a load distribution among the various voltage sources can be adjusted. Using the power default setting, the load distribution is variable and can be changed during operation of the aircraft.

The power controllers of the primary control 15, i.e. the active power controller 15A and the reactive power controller 15B, constitute reference variables for the power converter output voltage controller 19, which provides setpoint voltages for the bus bar connected to the respective control circuit 14. The detection unit 18 also obtains the supply voltages and supply currents for measurement from the bus bar connected thereto.

Figure 6:
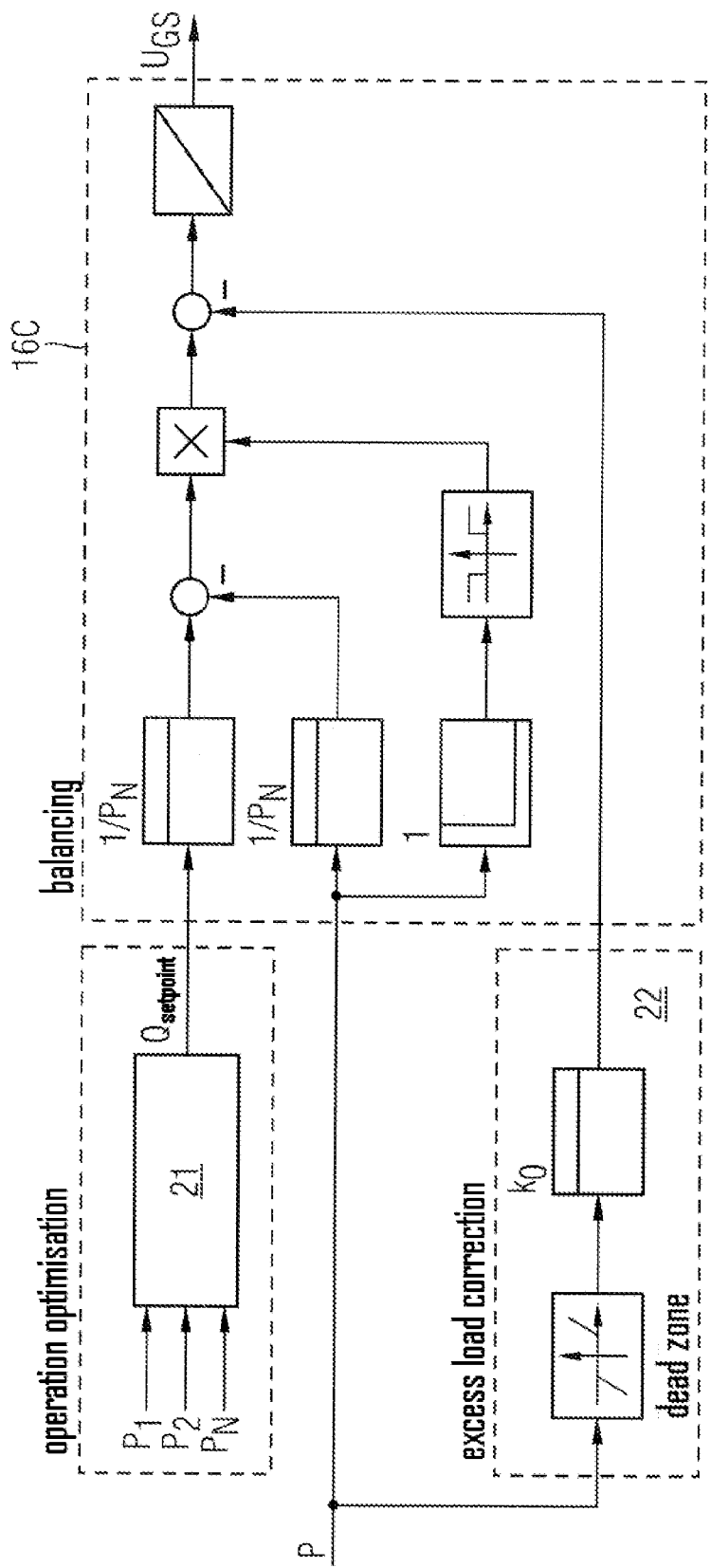
FIG. 6 is a block diagram showing a circuit for optimising operation of a secondary frequency control for the control circuit shown in FIG. 5.

FIG. 6, 7 show a variant of the balancing modules 16C, 17C provided for the secondary controls 16, 17 in a preferred embodiment. With reference to FIG. 6, the balancing module 16C of the secondary frequency control 16 of the control circuit 14 is provided with an active power default $P_{setpoint}$. The secondary control 16 controls the supply frequency f of the electrical system. The secondary control of the supply frequency is carried out as a function of the active power default $P_{setpoint}$. In the embodiment shown in FIG. 6, this active power default $P_{setpoint}$ is calculated and adjusted by a unit 21. The active power default $P_{setpoint}$ can be adjusted as a function of parameters exhibited by the electric powers P required y various electric loads 10-i, a power capacity of the respective voltage sources 2, 3 and a production cost for providing the respective power by the voltage sources 2, 3. The parameters P1, P2, Pn can, for example, be adjusted or read out from a configuration memory. The active power default $P_{setpoint}$ can be adjusted and calculated in accordance with an optimising function. In a possible embodiment, this optimising function can also be read out from a memory, in particular a configuration memory. In a possible embodiment, individual parameters $P_i$ are detected in a sensory manner. For example, the remaining power capacity of a fuel cell 3 can be determined on the basis of the remaining hydrogen $H_2$. In the embodiment shown in FIG. 6, an excess load correction unit 22 is provided which obtains the active power P as a reference variable from the detection unit 18 and is connected to a differential member within the balancing module 16C. The balancing module 16C also receives the active power P as a reference variable in further integrated controllers.

Figure 7:
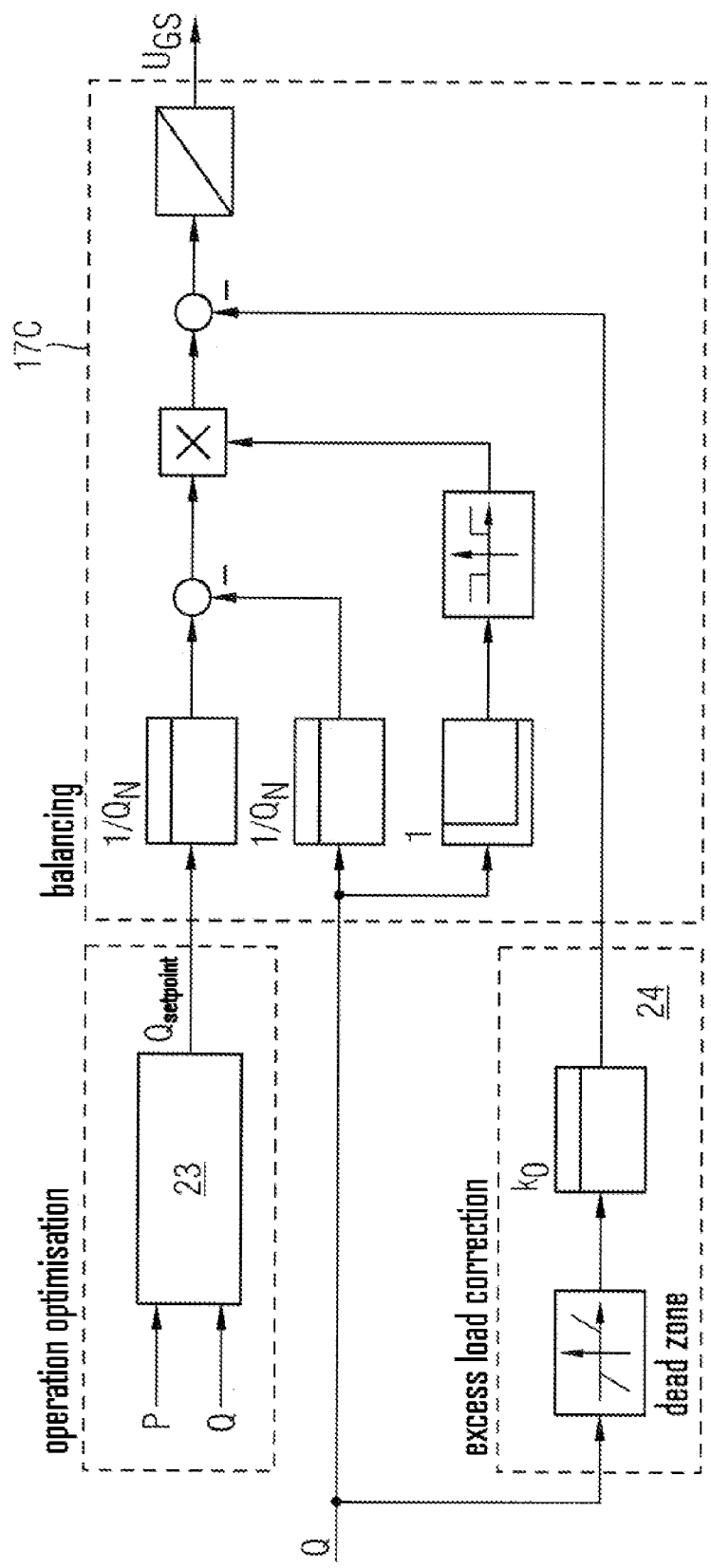
FIG. 7 is a block diagram showing a circuit for optimising operation of a secondary voltage control in the control circuit shown in FIG. 5.

FIG. 7 shows the construction of a balancing module 17C in a possible embodiment. The balancing module 17C is constructed similarly to the balancing module 16C. In the embodiment shown in FIG. 7, the balancing module 17C of the secondary voltage control 17 is provided with a reactive power default $Q_{setpoint}$. The secondary control 17 for controlling the effective value of the supply voltage carries out this control as a function of the reactive power default $Q_{setpoint}$. In the embodiment shown in FIG. 7, this reactive power default $Q_{setpoint}$ can be calculated and adjusted by a unit 23 which calculates the reactive power default $Q_{setpoint}$ as a function of reference variables, i.e. the active power P and the reactive power Q. The unit 23 is provided with the active power P and the reactive power Q by the detection unit 18. As shown in FIG. 7, the secondary control 17 also comprises an excess load correction unit 24 connected to the balancing module 17C. The excess load correction unit obtains the detected reactive power Q from the detection unit 18.

The costs of supplying the reactive loads cannot be set as a criterion, since reactive power does not need to be produced, and thus in principle has the same value for each source.

The effective capacity utilisation (apparent power S) of the power supply is a reasonable criterion. A different capacity utilisation of the sources can be caused by the optimised active load distribution. If a source with a relatively high capacity utilisation can reduce its reactive power supply, it has more scope for further increasing the active power. This can mean that a source which provides power at a favourable price can use its entire rated apparent power for supplying active power using very cheap energy and the reactive power required by the loads is provided by supplies or sources from which energy is expensive.

In the embodiment shown in FIG. 6, 7, the energy supply from various voltage sources is optimised. This can be achieved in an optimised manner according to various criteria in accordance with a predetermined target function. These criteria include, for example, the availability or production cost of the power or energy from the respective voltage sources. A power default setting can be given for the various power or voltage sources. An unbalanced power default setting is preferably provided for the various voltage or power sources. As shown in FIG. 6, 7, the balancing modules 16C, 17C are supplemented for this purpose by operation optimising components 21 and 23 respectively. If the power converters have a different power default setting for the balancing controllers, a corresponding load distribution is achieved.

The loading of the converter is set in relation to the rated power of the converter. Converters with different rated powers can thus be loaded similarly in relation to the respective rated power. The power default setting is based on a change in this value during operation. However, the rated power is not dynamically changeable without the power default setting.

In the device 1 according to the invention, the supplied power of the power converter depends on the load, not on a predetermined power. For this reason the power default is preferably set taking into account the maximum power of the respective power converter. In the event that the power is known to be distributed in an unbalanced manner among the power supply units, an excess load correction unit is provided.

Figure 8:
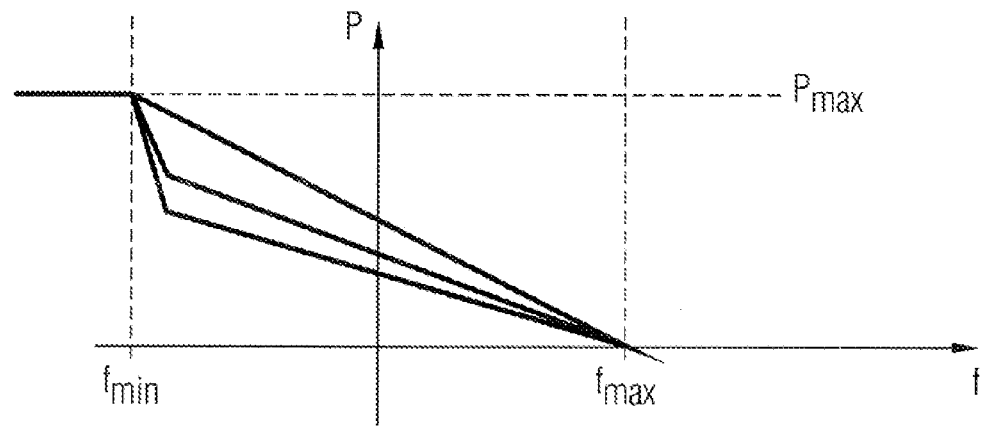
FIG. 8 is a graph by way of example for statics which can be used in the control circuit according to FIG. 5.

FIG. 8 shows exemplary statics or characteristics for a possible frequency/active power control. The frequency or supply frequency f is a measure for the loading or load of the electrical system. In the case of frequencies below a minimum frequency $f_{min}$, a short circuit can occur. For this reason, a characteristic or static originally having a linear incline, as shown in FIG. 8, has a bent curve progression in a possible embodiment. For these statics, the progression is steeper in the vicinity of the minimum frequency $f_{min}$, as shown in FIG. 8. Shortly before the lower threshold frequency $f_{min}$ of the admissible frequency band is reached, the supply power is increased. This increase in the supply power is necessary so that safety switches can still reliably trip even in the case of a possible short circuit.

Figure 9:
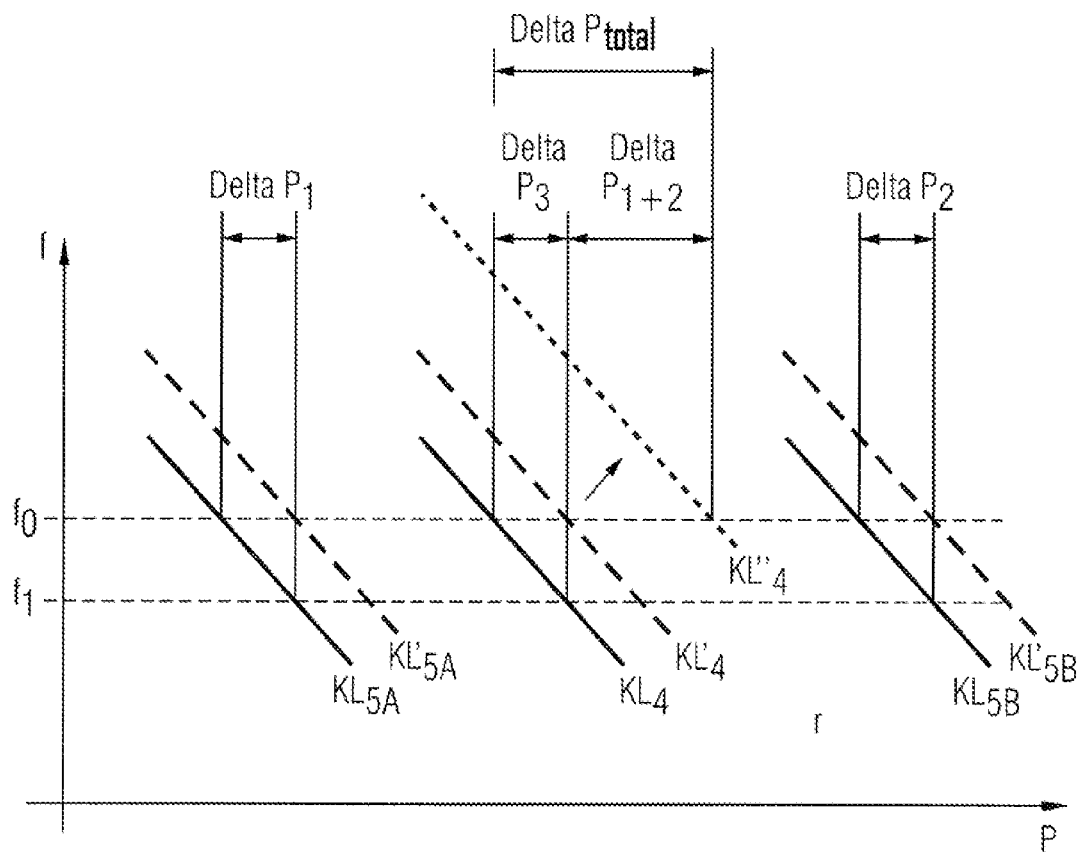
FIG. 9 is a graph clarifying the method according to the invention for providing an electrical system alternating voltage for an electrical system of an aircraft.

FIG. 9 is a graph clarifying the method according to the invention for providing an electrical system alternating voltage for an electrical system of an aircraft. In the case of a sudden change in load ΔP, i.e. in the case of an additional uptake of power by an additional electric load 10-$i$, for example by a galley, the sudden change in load in the electrical system according to the invention can be detected or picked up on the basis of a drop in the supply frequency f of the electrical system alternating voltage. In the graph shown in FIG. 9, the frequency of the original supply frequency f0 initially drops to a lower supply frequency f1 owing to the sudden change in load. The original supply frequency f0 can, for example, be 400 Hz.

With reference to FIG. 9, for the two frequency converters 5A, 5B and the inverter 4, the characteristic KL initially shifts to the right following the sudden change in load ΔP. Following this, a frequency compensation control is initially carried out by feeding power P into the electrical system. The characteristic is shifted parallel to the right, in order to supply the original frequency again at the higher power provided by at least one frequency converter 5A, 5B.

Additional power is also fed into the electrical system by the cyclo-inverter 4. As soon as the frequency compensation control is complete, a load compensation control is carried out, as shown in FIG. 9, a power provided by the frequency converters 5A, 5B being reduced, at least in part, and the power provided by the cyclo-inverter 4 being increased by the same amount. In the embodiment shown in FIG. 9, the inverter 4 takes on the entire load of the two frequency converters 5A, 5B and its characteristic $KL_4$ shifts further to the right to $KL_4$ once the load compensation has taken place. The characteristics KL of the two frequency converters 5A, 5B return to the starting positions prior to the sudden change in load ΔP. In the method according to the invention, peak loads which are caused, for example, by the intermittent operation of high-power loads, for example a galley, are compensated by the additional voltage source 3, for example the fuel cell BZ. As a result, the rated or reserve power of the engine generators 2A, 2B can be limited. For this reason, the control circuit of the fuel-cell inverter 4 is preferably loaded with a setpoint power default. The two frequency converters 5A, 5B supplied by the engine generators 2A, 2B are preferably loaded in a balanced manner. The static or characteristic of the fuel-cell inverter 4 can be shifted by the amount of the power default.

The supply frequency f drops as a result of increased loading or a sudden change in load ΔP, as shown in FIG. 9. In this case, the primary controllers of all the power converters or all the control circuits contained in the power converters become active and raise the frequency back to the original frequency f0. As a result, each of the three power converters 4, 5A, 5B initially takes on the same additional power in accordance with the static of its controller characteristic. The control circuits carry out a "frequency compensation control". Once the frequency compensation control is complete, the control circuit 14 within the fuel-cell inverter 4 becomes active. The control circuit 14 shifts its supply characteristic until the power setpoints of the frequency converters 5A, 5B return to their setpoints. The fuel cell 3 has then taken on the entire additional power owing to the load compensation control carried out, as shown in the example shown in FIG. 9.

In the case of balanced loading of all the changers or converters, all of their respective characteristics KL shift by the same amount. In this case, the two frequency converters 5A, 5B are loaded in a balanced manner and the fuel cell 3 is loaded according to the reserve capacity thereof. The control circuit 14 within the fuel-cell inverter 4 preferably also has access to the statics or characteristics of the two frequency converters 5A, 5B. In this way, the sum of the total power differential, i.e. the sudden change in load ΔP, can be calculated inside the control circuit 14 of the fuel-cell cyclo-inverter 4. The supply frequency f of the electrical system is preferably measured. As a result of this, the static or characteristic shifts by the correct amount by means of the power default setting. The method according to the invention offers the possibility of a fully modular construction. In a possible embodiment, the fuel cell 3 does not suddenly increase the power it supplies, but increases it continuously. Based on the supply frequency f1 measured after the sudden change in load ΔP, the necessary power can be determined and this power can then be readjusted. The frequency converters 5A, 5B, which are connected to the engine generators 2A, 2B, can effectively support a rapid compensation of the sudden change in load, i.e. a restoration of the frequency f and of the effective voltage setpoint. The power supplied by the frequency converters 5A, 5B drops again after the load has been taken up completely or in part by the fuel-cell inverter 4.

Owing to the controlled supply frequency f, the device 1 according to the invention for providing an electrical system alternating voltage AC for an electrical system of an aircraft also makes possible frequency-dependent load shedding of electric loads 10-$i$ within the aircraft. In a preferred embodiment, electric loads 10-$i$ which are connected to the electrical system are deactivated when the supply frequency f of the electrical system drops below a lower threshold frequency $f_{min}$. In a possible embodiment, electric loads 10-$i$ can also be connected to the electrical system when the supply frequency f of the electrical system exceeds an upper threshold frequency $f_{max}$. The lower and upper threshold frequencies are preferably adjustable for the respective application and can optionally be read out from a configuration memory.

A separation means for activating and deactivating an electric load 10-$i$ can be integrated into the bus bar and into the respective electric load itself.

In the case of generator power failure, in order not to compromise the supply security, in particular of critical electric loads 10-$i$, in this embodiment load is shed in a targeted manner when the frequency drops below a lower threshold frequency $f_{min}$, in that the loads 10-$i$ are separated or disconnected from the electrical system. As a result, a further reduction of the supply frequency f can be counteracted. In a possible embodiment, load is shed in stages. In a possible embodiment, the electric loads 10-$i$ can be supplied via correspondingly adjusted underfrequency relays. In a possible embodiment, these relays can comprise connections for measurement, in order to recognise parameters. In a possible embodiment, the supply frequency f and supply voltage are determined within a few milliseconds. As a result, any voltage cutoffs owing to network failures can be limited to a few milliseconds.

It is also possible to disconnect the supply using an underfrequency relay.

The supply frequency f is a measure for the loading of the electrical system by active power P. If the effective supply frequency is above a particular frequency threshold for a certain period, one or more electric loads can be connected. If the supply frequency f drops below the lower threshold value $f_{min}$, the corresponding electric load 10-$i$ can be deactivated in a controlled manner.

In a possible embodiment, the various electric loads 10-$i$ within the aircraft are prioritised by allocating different frequency thresholds. Critical or important electric loads within the aircraft have a high priority (Prio 1) and have a low frequency threshold, i.e. they are always connected. These electric loads can, for example, be supplied with power by the engine generators 2A, 2B alone. Electric loads having a medium priority (Prio 2) have, for example, a medium frequency threshold and can be supplied via the engine generators 2A, 2B and via the fuel-cell 3. Electric loads having a low priority (Prio 3) are allocated a high frequency threshold, meaning that they can only be switched on when the fuel cell 3 is operating at full load.

In a possible embodiment of the device 1 according to the invention, an electric load 10-$i$ is only shed once this action has been confirmed by a crew member.

The power converters of the device 1 according to the invention comprise frequency converters 5A, 5B and one or more inverters 4. The frequency converters 5A, 5B are supplied by engine generators 2A, 2B. The function of the frequency converters 5A, 5B is to provide the standard power for compensating a sudden change in load and for providing a base load. Critical loads are also supplied without the fuel cell 3 being in operation. These can also be non-critical loads which need to be supplied with power in all operating states of the aircraft, thus also when the fuel cell 3 is switched off. Power is generated close to the loads. The frequency converter 5A, 5B are also used to compensate the reactive power. In a possible embodiment, the frequency converters 5A, 5B supply the necessary power for short-circuit currents for reliable tripping of the various power switches of the electrical system. The frequency converters 5A, 5B are further provided for buffering peak loads during short-term operation.

Each of the inverters 4 is preferably supplied with a direct voltage DC by a fuel-cell 3. The cyclo-inverters 4 are also used for supplying the base load, preferably the active power P. The inverters can also be provided for supplying a low reactive power. The inverters 4 provide, in particular, power for supplying power-intensive electric loads 10-$i$ with relatively high loads. They also provide corresponding short-circuit currents for tripping the power switches. They can also be used for buffering peak loads during long-term operation.

The device 1 according to the invention has, inter alia, the advantage that the electrical system is provided with a high-quality electrical system alternating voltage, i.e. having an approximately constant frequency and effective voltage. Unbalanced phase loads can also be reliably supplied. In addition, the device 1 according to the invention offers a particularly fail-safe and sturdy energy or power supply for the loads 10-$i$ within the aircraft. The electrical system according to the invention can be constructed so as to be fully modular and can be enlarged in a simple manner. The device 1 according to the invention is thus fully scalable. The device 1 according to the invention further offers the possibility of connecting external equipment without difficulty. In a possible embodiment, the power supply can be optimised with regard to the active and reactive power. Peak loads are reliably buffered. The device 1 according to the invention further has the advantage that power is generated close to the loads and cabling within the aircraft is optimised in terms of weight. The reserve power required can be limited. The combined maximum load is lower than the sum of the individual maximum loads. In this way it is possible to dimension the engine generators 2A, 2B accordingly and save fuel.

The device 1 according to the invention is suitable for any desired aircraft, in particular passenger aircraft, transport aircraft, but also helicopters.

The method according to the invention for providing an electrical system alternating voltage is preferably carried out in real time. The electrical system alternating voltage can be controlled by independent control circuits 14 which are provided in the various power converters 4, 5. In an alternative embodiment, the method according to the invention can also be carried out by a program which carries out the method steps for providing the electrical system alternating voltage. This program is carried out, for example, by a microprocessor. An approximately real-time control can take place by means of a high clock frequency of the microprocessor.

In the device 1 according to the invention, a control circuit 14 is preferably used which does not need to communicate with other control circuits in other converters. This increases the reliability. In an alternative embodiment, control circuits can also be used which communicate with one another via one or more data channels and exchange information. This can take place via a common bus.

In the case of particularly high reliability requirements, the respective control circuit 14 can also be configured to be redundant.

LIST OF REFERENCE NUMERALS 1 device for providing an electrical system alternating voltage
2 engine generators
3 additional voltage source
4 inverter
5 frequency converter
6 switch
7 bus bar 8 bus bar
9 switch
10 electric loads
11 interface
12 transfer line
14 control circuit
15 primary control
16 secondary control
17 secondary control
18 detection unit
19 alternating voltage controller
20 control line
21 operation optimising means
22 excess load correction means
23 operation optimising means
24 excess load correction means

The invention claimed is:

1. A device for providing an electrical system alternating voltage for an electrical system
   of an aircraft, comprising:
   at least one engine generator which provides an alternating voltage;
   at least one fuel cell which provides a direct voltage;
   at least one frequency converter for converting the alternating voltage provided by the engine generators into a first output alternating voltage; and
   at least one cyclo-inverter for cyclo-inverting a direct voltage provided by the at least one fuel cell into a second output alternating voltage which is synchronous with the first output alternating voltage and, together with the first output alternating voltage, constitutes the electrical system alternating voltage;
   wherein the at least one frequency converter is configured to reduce at least in part a power provided by the at least one frequency converter and the cyclo-inverter is configured to increase by the same amount the power provided by the cyclo-inverter to carry out a load compensation control following the frequency compensation.

2. The device according to claim 1, wherein the cyclo-inverter and the frequency converters comprise a control circuit for controlling the electrical system alternating voltage, which control circuit comprises
   a primary control for synchronising the output alternating voltages and
   at least one secondary control for controlling the supply frequency and the effective value of the electrical system alternating voltage.

3. The device according to claim 2, wherein the supply frequency of the electrical system alternating voltage depends on the loading of the electrical system by active power and the effective value of the electrical system alternating voltage depends on the loading of the electrical system by reactive power.

4. The device according to claim 2, wherein an active power default is provided for the secondary control for controlling the supply frequency of the electrical system and wherein the secondary control for controlling the supply frequency carries out the control as a function of the provided active power default.

5. The device according to claim 4, wherein the active power default is adjusted as a function of parameters which include power requirements of electric loads, a power capacity of the respective voltage source and a production cost for the provision of the power by the respective voltage source.

6. The device according to claim 2, wherein the control circuit comprises a detection unit which detects a sudden change in load on the basis of the supply voltage and the supply frequency of the electrical system and a calculation unit which calculates, on the basis of the detected supply voltage and the detected supply frequency of the electrical system, an active power and a reactive power as reference variables for the primary control and the secondary control.

7. The device according to claim 1, wherein electric loads which are connected to the electrical system are deactivated if the supply frequency of the electrical system falls below a lower threshold frequency and wherein electric loads are connected to the electrical system if the supply frequency of the electrical system exceeds an upper threshold frequency.

8. The device according to claim 4, wherein the secondary control controls the effective value of the supply voltage as a function of a reactive power default.

9. The device according to claim 1, wherein the frequency converter and the cycloinverter operate in parallel and are interconnected via one or more bus bars of the electrical system.

10. The device according to claim 9, wherein the electric loads which are supplied with the electrical system alternating voltage are connected to the bus bars via power switches.

11. The device according to claim 10, wherein an interface for supplying at least one connectable external electric load is provided on one of the bus bars and is supplied with the electrical system alternating voltage of the aircraft while the aircraft is on the ground.

12. The device according to claim 1, wherein water which is produced by the fuel cell during operation is provided to the passengers of the aircraft as useful water.

13. A method for providing an electrical system alternating voltage for an electrical system of an aircraft, comprising the steps of:
   (a) detecting a sudden change in load in the electrical system of the aircraft on the basis of a drop in the supply frequency of the electrical system alternating voltage or in the supply voltage in the electrical system; and
   (b) carrying out a frequency compensation control or voltage compensation control by feeding into the electrical system power which is provided by at least one frequency converter which converts an alternating voltage provided by an engine generator of the aircraft into a first output alternating voltage, and by feeding into the electrical system power which is provided by a cyclo-inverter which converts a direct voltage provided by a fuel-cell into a second output alternating voltage which is synchronous with the first output alternating voltage and, together with the first output alternating voltage, constitutes the electrical system alternating voltage of the electrical system
   wherein following the frequency compensation control a load compensation control is carried out, a power provided by the at least one frequency converter being reduced, at least in part, and the power provided by the cyclo-inverter being increased by the same amount.

* * * * *